United States Patent [19]
Bunker

[11] 3,942,364
[45] Mar. 9, 1976

[54] ENGINE EFFICIENCY INDICATOR

[76] Inventor: Homer S. Bunker, 901 Martha Cove, Memphis, Tenn. 38122

[22] Filed: Dec. 9, 1974

[21] Appl. No.: 530,726

[52] U.S. Cl. .................................................. 73/115
[51] Int. Cl.² .......................................... G01L 3/26
[58] Field of Search ............................. 73/115, 116

[56] References Cited
UNITED STATES PATENTS

| | | | |
|---|---|---|---|
| 1,401,315 | 12/1921 | Clark | 73/114 |
| 2,975,633 | 3/1961 | Hautzenroeder | 73/118 |
| 3,608,368 | 9/1971 | Cuff | 73/115 |

*Primary Examiner*—James J. Gill
*Assistant Examiner*—Anthony V. Ciarlante
*Attorney, Agent, or Firm*—Paul M. Denk

[57] ABSTRACT

A device for indicating certain undesirable operating conditions of an automobile engine or the like. The device is preferably incorporated with the usual speedometer or tachometer normally situated on the instrument panel of the vehicle. Accordingly, since the device functions in conjunction with the usual speedometer needle or the like, included therewith is a second needle indicator which normally is aligned with the speedometer needle and disposed in front of or behind it, i.e., when the efficiency of the engine is within certain predetermined desirable limits. The device includes a bellows assembly which is responsive to the changes in the intake manifold vacuum of the engine normally brought about by certain settings of the throttle. Also included is a shifter assembly which is operably interposed between the speedometer needle, or the like, and the second needle and is responsive to the bellows assembly for proportionably displacing the second needle from the speedometer needle as the engine efficiency diminishes below the predetermined desirable limits.

13 Claims, 5 Drawing Figures

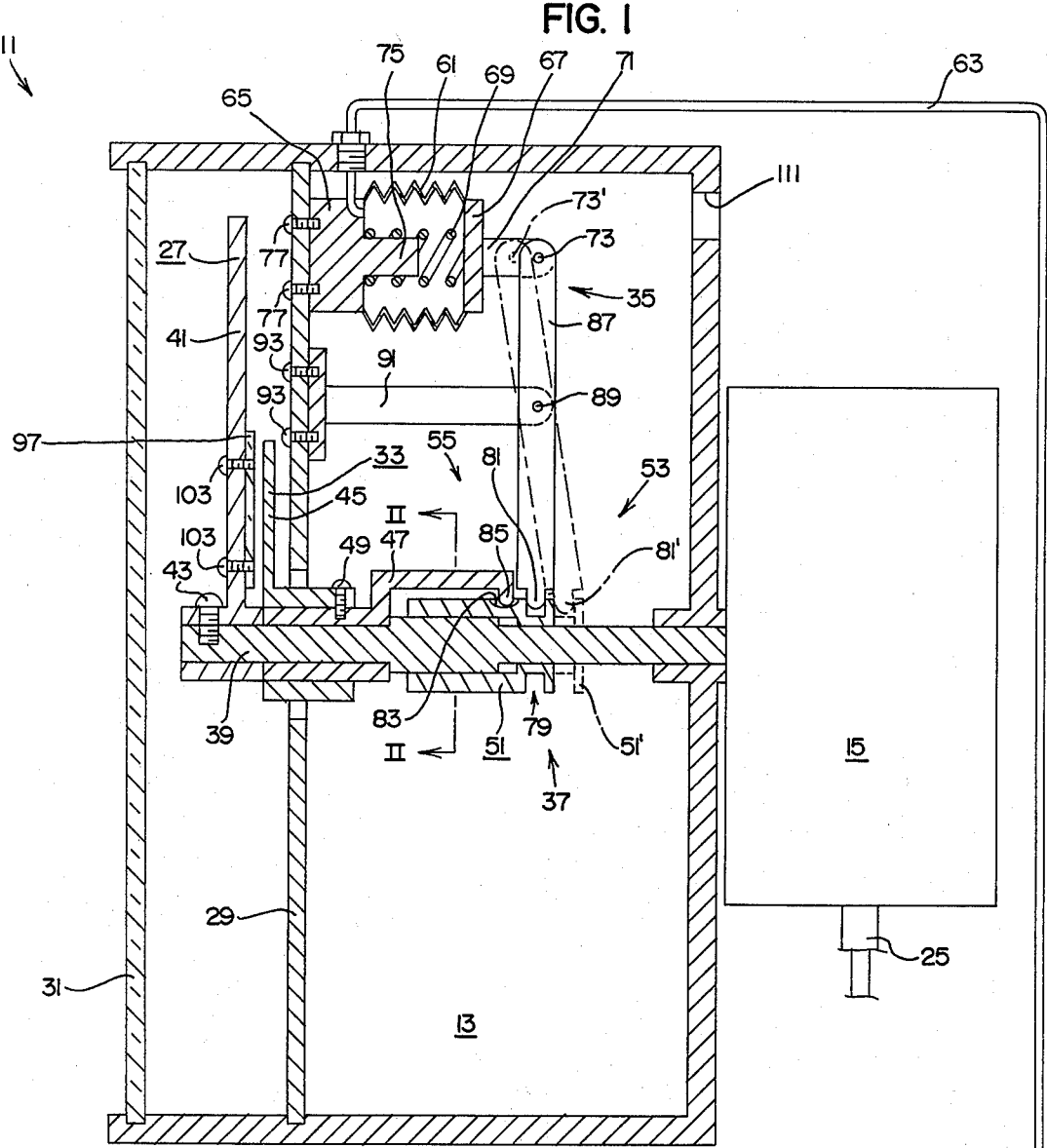
FIG. 1
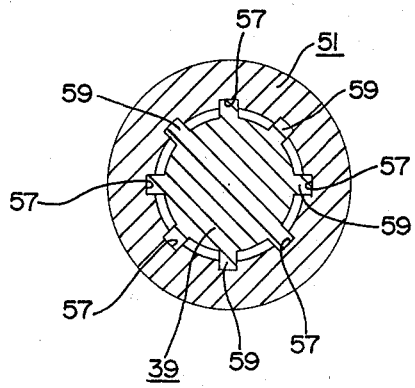
FIG. 2
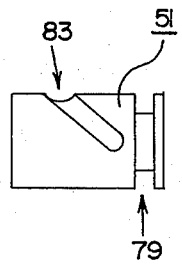
FIG. 3
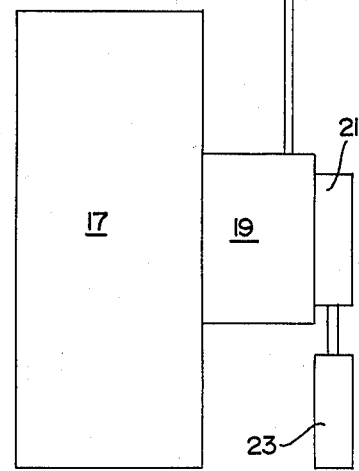

ENGINE EFFICIENCY INDICATOR

BACKGROUND OF THE INVENTION

1. Field of the Invention

This invention relates to the field of instruments for indicating engine efficiency.

2. Description of the Prior Art

Applicant is aware of the following U.S. patents: the Dickinson U.S. Pat. No. 1,187,279; the Clark U.S. Pat. NO. 1,401,315; the Brandenburg U.S. Pat. No. 1,527,114; the Davis U.S. Pat. No. 1,552,119; the Schulz U.S. Pat. No. 2,430,413; the Leto U.S. Pat. No. 3,440,870; and the Cuff U.S. Pat. No. 3,608,368. None of the above patents suggest or disclose applicant's device.

It should be pointed out that the nation is currently in the midst of an energy crisis, particularly in short supply for the tremendous demand is gasoline and oil. Accordingly, a need exists for vehicle operators to be, as a part of their normal driving procedures, made constantly aware of conditions which result in poor gasoline mileage. In other words, it is believed that most vehicle operators are concerned about the fuel crisis and would voluntarily take the necessary corrective action to improve the operating efficiency of the automobile engine if provided with proper means which constantly remind and qualitatively educate about efficiency in engine operation.

SUMMARY OF THE INVENTION

The present invention is directed towards overcoming the problems and disadvantages of previous engine efficiency indicating instruments. The concept of the present invention is to provide a device for indicating certain undesirable operating conditions of an automobile engine or the like. The device is incorporated with the usual speedometer or tachometer normally situated on the instrument panel of the vehicle. Accordingly, since the device functions in conjunction with the usual speedometer needle or the like, included therewith is a second pointer or indicator which normally is aligned with the usual speedometer or tachometer indicator when the efficiency of the engine is within certain predetermined desirable limits. The device includes a bellows assembly which is responsive to the changes in the intake manifold vacuum of the engine which normally are brought about by certain settings of the throttle. Also included is a shifter assembly which is operably interposed between the speedometer indicator, or the like, and the second or added indicator and is responsive to the bellows assembly for proportionably displacing the second indicator from the normal speedometer indicator as the engine efficiency diminishes below the predetermined desirable limits.

A specific embodiment of the present invention would directly indicate both vehicle speed (or rpm) and quantitatively indicate that segment of the vehicle engine manifold vacuum spectrum normally interpretive that: 1. Engine fuel/air ratios are enriched for added power at the expense of vehicle mileage economy. 2. The vehicle automatic transmission is restrained to lower ratios for added power at the expense of vehicle mileage economy. 3. The engine timing is not set at the optimum setting. 4. Some other engine function normally controlled by or recognizable through manifold vacuum is functioning at the expense of vehicle mileage economy. The relative displacement of the second point to the primary speed may be scaled by a dial attached to either pointer. The term manifold vacuum as used herein is defined for clarity of explanation as vacuum referenced to atmospheric pressure. Also included within the term are carburetor venturi induced vacuums, variable positive pressures from supercharged engines, and any of the other commonly accepted sources of pressure or vacuum which are related to vehicle control and/or performance and referenced to full vacuum atmospheric or any secondary pressure pertinent to the determination of vehicle efficiency.

The present invention is particularly desirable to assist the operator in the manipulation of the engine throttle in a manner that will preclude opening the throttle so wide that the carburetor system advances the fuel/air ratio, thus lowering vehicle fuel economy. Applicant recognizes that many instruments are available to quantitatively indicate the manifold vacuum. Some of these are equipped with additional scale faces which also interpret manifold vacuum in normally accepted terms of fuel economy. Several instruments are available for a yes/no interpretation of manifold vacuum with accompanying acceptable or non-acceptable fuel/air ratios.

In the light of the foregoing the primary object of the present invention is to make available a simplified direct reading instrument that will: 1. Firmly indicate when the engine is being operated inefficiently. 2. Provide quantitative manifold vacuum and speed information useful to the operator in making the necessary adjustment to the throttle. 3. Provide the information in a form that will require no additional operator visual attention beyond that normally accorded the vehicle speed (or engine rpm) indicator. 4. Provide the information in a single instrument requiring no more instrument panel space than allocated to a standard vehicle speed indicator or tachometer. 5. Provide qualitative indications interpretive in terms of relative fuel economy for operator selected throttle openings which advance fuel/air ratios at the expense of mileage economy.

DESCRIPTION OF THE DRAWINGS

FIG. 1 is a sectional view of the engine efficiency indicator of the present invention shown suitably connected to a diagrammatically depicted internal combustion system with the view of the indicator being taken as on a vertical plane through the center line of the indicator.

FIG. 2 is an enlarged sectional view taken as on the line II—II of FIG. 1 with certain structure being deleted for brevity to clearly show the interlocking relationship of a sliding sleeve member concentrically disposed about a rotatable shaft.

FIG. 3 is a side elevational view of the sliding sleeve member.

DESCRIPTION OF THE PREFERRED EMBODIMENT

Figure 4:
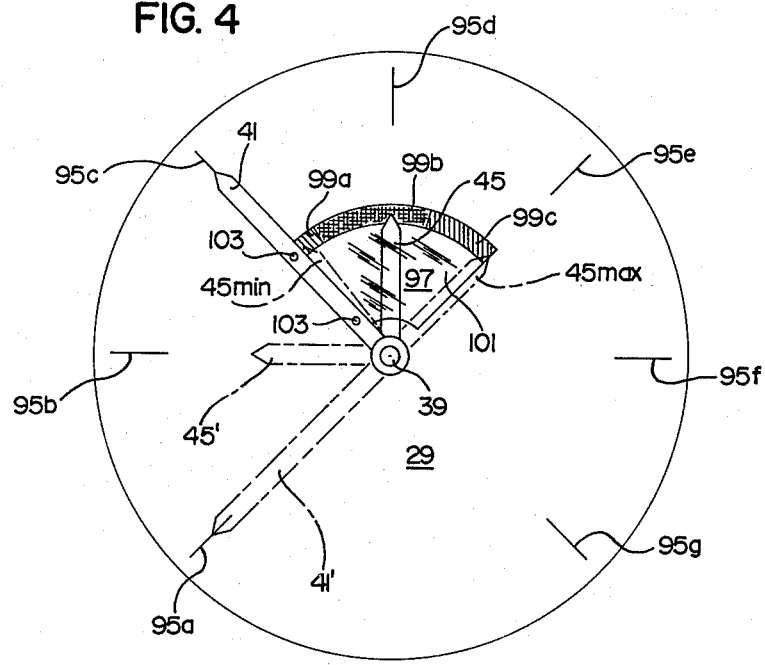
FIG. 4 is a front elevational view depicting one embodiment of the face portion of the indicator of the present invention.

The engine efficiency indicator of the present invention is generally character referenced in the drawings by the numeral 11. However, it should be understood that the engine efficiency indicator 11 of the present invention is shown in combination with certain rate indicator means, e.g., well-known speed indicator means or tachometer means. In other words, typical speed indicator devices and/or tachometers include an instrument case section 13 for housing certain components, e.g., the indicator needle and dial, etc., and a standard drive case 15 for housing other components, e.g., rotating permanent magnet, etc. The conventional drive case 15 does not contribute structure for disclosing the present invention. Therefore, the drive case 15 is simply diagrammatically depicted in FIG. 1 of the drawings. Other structure diagrammatically depicted in FIG. 1 includes an internal combustion engine 17 having an intake manifold 19, a carburetor 21 conveniently operated by a conventional throttle or accelerator 23. Coupled to the drive case 15 is a conventional flexible drive cable 25, only one end thereof being shown. It should be understood that the remote end of the drive cable (not shown) is connected to the engine 17 in the usual manner when the engine efficiency indicator 11 is intended to be a tachometer. On the other hand, the drive cable 25 is conveniently attached to the transmission (not shown) or other convenient structure of the vehicle in the event the engine efficiency indicator 11 of the present invention is intended to be a speed indicating device.

Accordingly, the indicator 11 includes the usual first visual indicator, character referenced by the numeral 27, disposed a spaced distance outwardly from an instrument dial characterized by the numeral 29. The dial 29 preferably is protected by a transparent disc 31. It should be understood that the first visual indicator 27 depicted in the drawings is the pointer or needle type, however, it is anticipated that the present invention may be incorporated with conventional rate indicators of the type which depicts an elongated line or bar which varies in length in proportion to the speed of the vehicle, etc. Therefore, the first visual indicator 27 depicted in the drawings is intended to be only one way of incorporating the engine efficiency indicator of the present invention with typical rate indicators.

The engine efficiency indicator means 11 of the present invention is intended for indicating within limits the operating efficiency of the internal combustion engine 17 which includes the intake manifold 19 and the throttle 23 as previously mentioned. The engine efficiency indicator means 11 of the present invention generally includes a second visual indicator generally shown in FIG. 1 by the numeral 33, which is normally aligned with the first visual indicator 27 when the efficiency of the engine 17 is within certain predetermined desirable limits. Also included are pressure relative to atmospheric pressure sensing means, as at 35, responsive to the intake manifold vacuum of the engine 17 for sensing changes in the magnitude of the intake manifold vacuum normally brought about by certain settings of the throttle or accelerator 23. Additionally, the indicator means 11 includes shifter means, as at 37, responsive to the pressure sensing means 35 and is operably interposed between the first and second visual indicators 27, 33 for proportionably displacing the second visual indicator 33 from the first visual indicator 27 as the efficiency of the engine 17 diminishes below the certain predetermined desirable limits above mentioned.

From FIG. 1 of the drawings it may clearly be seen that the first visual indicator alluded to above includes a shaft 39 conveniently journaled to the instrument case section 13 for free rotation without axial movement thereof and a rate indicating needle 41 as best shown in FIG. 4 of the drawings. The rate indicating needle 41 is fixedly attached to the shaft 39 by a bolt or screw 43 or the like. The second visual indicator 33 alluded to above includes an engine efficiency indicating needle 45 as clearly shown in FIG. 4 of the drawings. The needle 45 is concentrically disposed about an intermediate member 47 (FIG. 1) and is fixedly attached thereto in any well-known manner as with a bolt or screw 49 or the like. The intermediate member 47 is concentrically disposed about the shaft 39. The needle 45 and the intermediate member 47 are free to pivotally swing independently of the shaft 39, and are restrained from axial displacement relative to the shaft 39.

The shifter means 37 alluded to above includes a sleeve member 51 concentrically disposed about, and being rotationally driven by, the shaft 39 with the sleeve member 51 being free to slide to and fro along the rotating axis of the shaft 39. The shifter means 37 also generally includes first connecting means, as at 53, for connecting the pressure sensing means 35 to the sleeve member 51 whereby changes in the magnitude of the intake manifold vacuum cause the sleeve member 51 to slide axially along the shaft 39. Further, the shifter means 37 generably includes second connecting means, as at 55 for connecting the sleeve member 51 to the engine efficiency indicating needle 45 whereby the sliding movement of the sleeve member 51 proportionably displaces the engine efficiency indicating needle 45 in an appropriate direction from the rate indicating needle 41, as illustrated in FIG. 4 of the drawings.

From FIGS. 2 and 3 of the drawings it may clearly be seen that the sleeve member or sleeve means 51 is elongated in side elevational view and is provided with internal spline structure, as at 57, for being rotatably driven by the shaft 39. The shaft 39 includes an external spline portion, as at 59, for interlocking engagement with the sleeve member 51, i.e., the sleeve means 51 being free to slide to and fro along the rotating axis of the shaft 39.

The pressure sensing means 35 alluded to above preferably includes bellows means, as at 61, which is communicated with the intake manifold 19 through a tubular member 63 as clearly shown in FIG. 1 of the drawings. The bellows means 61 includes a fixed base member 65, a movable member 67, and a compression spring 69 which yieldably urges the movable member 67 outwardly away from the fixed base member 65 at manifold vacuums less than the design vacuum. It should be understood that the movable member 67 includes a lug portion 71 having a pivot pin 73 attached thereto for purposes to be described. The pivot pin 73 is shown in unbroken lines at its outermost position and is shown in broken lines at its innermost position indicated by the numeral 73'.

It will be appreciated by those skilled in the art that the pivot pin 73 is moved to its outermost position when the engine 17 is not operating, i.e., the pressure within the intake manifold 19 simply being atmospheric pressure. Additionally, with proper structure and dimension of the bellows means 61, the pivot pin 73 is carried to its innermost position 73' when the engine 17 is operating efficiently, i.e., the vacuum within the intake manifold 19 being usually greater than 8 inches of mercury.

The following are some factual data for typical operating conditions of an engine: The intake manifold vacuum of an engine operating at about half throttle or propelling a vehicle steadily on a level surface at about 45 miles per hour would be about 21 inches of mercury. Also, a wide open throttle would reduce the manifold vacuum to less than one inch of mercury. In this regard, it should be mentioned that typical carburetors incorporate what is commonly known in the art as a vacuum acutated enrichment valve which begins to act at some design manifold vacuum normally occurring between a throttle close position and a throttle wide open position. Normally, the enrichment valve is designed to enrich the fuel/air ratio at manifold vacuum of less than 8 inches of mercury on standard automobile engines.

The most inefficient condition of the engine is during the time that the enrichment valve in the carburetor is open. Therefore, the engine efficiency indicator 11 of the present invention is intended to visually indicate to the vehicle operator the starting instant of this inefficient condition, and the extent of the condition as it progresses. In other words, the engine efficiency indicating needle 45 preferably remains at all times aligned with the rate indicating needle 41 during normal efficient engine running, e.g., with manifold vacuum between 21 and 8 inches of mercury. Therefore, the fixed base member 65 preferably includes a stop portion 75 which prevents movement of the movable member 67 at manifold vacuums great enough to maintain closure of the enrichment valve in the carburetor.

It should be understood that for certain embodiments the stop portion 75 may be deleted without departing from the spirit and scope of the present invention. In this event, the engine efficiency indicating needle 45 would, of course, quantitatively displace past the rate indicating needle 41 in proportion to the extent of manifold vacuum excursions greater than 8 inches of mercury, e.g., 15 or 21 inches of mercury or the like. The fixed base member 65 preferably is attached to the instrument dial 29 in any well-known manner as by bolts 77 or the like.

The first connecting means 53 alluded to above includes providing the sleeve means 51 with a concentric groove, as at 79, disposed adjacent one end thereof as clearly shown in FIGS. 1 and 3 of the drawings. Additionally, the first connecting means 53 includes a first nub, as at 81, which extends into the concentric groove 79 for urging the sleeve means 51 to slide axially along the shaft 39 as the bellowslike pressure sensing means 35 responds to changes in the intake manifold vacuum.

The second connecting means 55 alluded to above includes providing the sleeve means 51 with a helical groove, as at 83 in FIG. 3, disposed a spaced distance from the concentric groove 79. The second connecting means 55 also includes a second nub, as at 85 in FIG. 1 of the drawings. The nub 85 extends into the helical groove, as best shown in FIG. 3 of the drawings for urging the engine efficiency indicating needle 45 to a position which is displaced from the rate indicating needle 41. Therefore, when the intake manifold vacuum becomes less than the design vacuum the sleeve means 51 is caused to slide proportionately as the efficiency of the engine 17 diminishes below the desirable limits. The sliding action of the sleeve 51 angularly displaces or advances the second visual indicator 33 ahead of the first visual indicator 27.

More specifically, the engine efficiency indicator 11 of the present invention includes lever means, as at 87, which is pivotally connected at the one end thereof to the pivot pin 73 and the other end carries the first nub 81. The lever means 87 is pivotable about a pivot pin 89 which is rigidly supported by a support member 91. The support member 91 is fixedly attached to the instrument dial 29 in any well-known manner, as by bolts 93 or the like. Therefore, it should readily be seen that as the vacuum within the intake manifold 19 changes from a nominal 8 inches of mercury toward 0 inches of mercury, the pivot pin 73 moves away from the position 73' and the first nub 81 moves away from the position referenced by the numeral 81'. Accordingly, movement of the first nub 81 from the position 81' slides the sleeve means 51 away from the position referenced by the numeral 51'.

The intermediate member 47 is free to rotate about the shaft 39 and carries the second nub 85 as clearly shown in FIG. 1 of the drawings. Therefore, slidable movement of the sleeve means 51 away from the position 51' is effective to cause the second nub 85 to travel along the helical groove 83 which causes rotation of the intermediate member 47 about the shaft 39. Since the engine efficiency indicating needle 45 is fixedly attached to the intermediate member 47, the engine efficiency indicating needle 45 is angularly displaced from the rate indicating needle 41 in a manner to be even more fully described.

Particular attention is now directed toward FIG. 4 of the drawings wherein it may be seen that the instrument dial 29 includes a plurality of graduation marks or indicia 95 which are individually designated as 95a, 95b and 95c, etc. Minimum displacement of the engine efficiency indicating needle 45 in relation to the rate indicating needle 41 is illustrated in FIG. 4 of the drawings in broken lines and character referenced by the numeral 45 having a suffix consisting of the letters "min". On the other hand, maximum displacement of the needle 45 in relation to the rate indication needle 41 is illustrated in broken lines and character referenced by the numeral 45 having a suffix consisting of the letters "max."

More specifically and still referring to FIG. 4, the rate indicating needle 41 is shown moved from its minimum position 41' where it is shown by broken lines to be aligned with the graduation indicia 95a, to the position 41 where it is shown by solid lines to be aligned with the graduation indicia 95c. Likewise, at fixed manifold vacuum the same fractional rotation of the shaft 39 is effective to angularly displace the engine efficiency indicating needle 45 an equal amount from the position shown in broken lines by the numeral 45' to the position shown in solid lines by the numeral 45. In other words, fractional rotation of the shaft 39 when manifold vacuum is constant is effective to cause simultaneous fractional rotation of both needles 41 and 45 irrespective of the relative positions they may have one with the other, i.e., both needles 41 and 45 being angularly displaced the same number of degrees by the turning action of the shaft 39.

In order to more fully explain displacement of the engine efficiency indicating needle 45 in relation to rate indicating needle 41 it would be helpful to assume that the engine efficiency indicator 11 as depicted in FIG. 4 is being utilized as a speed indicating device, i.e., as opposed to a tachometer. Additionally, assume that the graduation indicia 95c represents 45 miles per hour. Under these conditions, the vehicle is shown by the rate indicating needle 41 as traveling at 45 miles an hour. Displacement of the engine efficiency indicating needle 45 from an aligned position behind the needle 41 (where it cannot be seen) to the position 45 min is achieved by minimal opening of the throttle 23 to the extent that the enrichment valve in the carburetor is beginning to be actuated, i.e., the rate indicating needle 41 initially continues to indicate the 45 miles per hour. However, disregard the fact that the vehicle may speed up or the rate indicating needle 41 may start moving away from the graduation indicia 95c, particularly if the vehicle is not going uphill. Opening the throttle 23 all the way causes further reduction in manifold vacuum, i.e., the manifold vacuum is now approaching atmospheric pressure, which causes the needle 45 to advance to the position 45 max even though the rate indicating needle 41 may still continue to indicate 45 miles per hour, i.e., disregard the fact that the vehicle may speed up. Actually, since the vehicle may be going up a steep hill or some other condition may prevail which creates a load on the engine 17 the speed may not vary even though the throttle 23 is wide open. However, it should be understood that when the rate indicating needle 41 does advance, i.e., move toward the graduation indicia 95d, the angular displacement between the needles 45, 41 remains constant unless there is a change in manifold vacuum.

From FIGS. 1 and 4 of the drawings it may be seen that the indicator 11 includes a scale, as at 97, having certain indicia, as at 99, for visually indicating degrees of less than desirable operating efficiency of the engine 17. More specifically, the scale 97 includes a transparent disc segment 101 fixedly attached to the rate indicator needle 41 in any well-known manner as with the bolts 103 or the like. From FIG. 1 of the drawings it may be seen that the engine efficiency indicating needle 45 is disposed behind the transparent disc segment 101 whereby the displacement thereof may readily be observed through the transparent disc segment 101 and measured by the indicia 99 aligned therewith. The indica 99 may include graduations or the like but preferably includes certain colors to aid in warning the operator of various degrees of less than desirable engine efficiency. In this regard, the indicia 99 as shown in FIG. 4 includes a short green portion 99a, a yellow portion 99b, and a red portion 99c. Accordingly, the needle 45 is shown in FIG. 4 in an intermediate position and aligned with the yellow indicia 99b.

Figure 5:
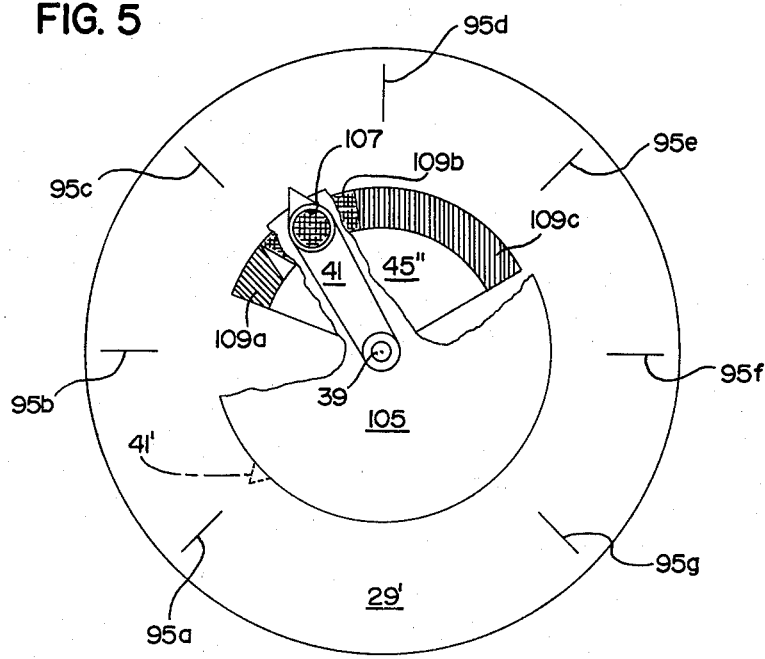
FIG. 5 is a front elevational view depicting another embodiment of the face portion of the indicator of the present invention.

Another embodiment of the instrument dial 29 is herein disclosed and is shown in FIG. 5 of the drawings and character referenced therein by the numeral 29'. The instrument dial 29' includes an opaque disc, as at 105, with the rate indicating needle 41 constituting a radially aligned segment thereof. In other words, the rate indicating needle 41 may, for the most part, simply be scribed onto the opaque disc 105. The opaque disc 105 is provided with a transparent window, as at 107, which is disposed coincident with at least a portion of the rate indicating needle 41 as clearly shown in FIG. 5 of the drawings. Additionally, the engine efficiency indicating 45'' is fan shaped as clearly shown in FIG. 5 and is disposed behind the opaque disc 105, i.e., portions of the opaque disc 105 are cut away to reveal the fan shaped efficiency indicating needle 45''. A portion of the fan shaped needle 45'' is visible through the transparent window 107 and the fan shaped engine efficiency indicating needle 45'' includes indicia 109 constituting at least two colors but preferably three or a color gradient, or any combination which establishes the scale 97, i.e., the indicia 109 constituting a green portion 109a, a yellow portion 109b, and a red portion 109c. Therefore, the instant of displacement of the engine efficiency indicating needle 45'' from the rate indicating needle 41 may readily be observed through the transparent window 107, with the degree of efficiency generally being indicated and measured by the particular color, color gradient, or colors being visibly displayed through the transparent window 107. The preferred displacement of the fan shaped needle 45'' relative to the rate indicating needle 41 is counterclockwise as manifold vacuum lowers in order that when varied indicia colors are at the same time visible through the transparent window 107, that color normally associated with increasing danger will be located on the side toward increasing rate indicia.

It should be understood that the interior of the instrument case section 13 is vented to the atmosphere in any well-known manner, as with a vent hole 111 or the like, in order that the pressure sensing means 35 shall be responsive to manifold vacuum relative to atmospheric pressure. Where the invention is incorporated into vehicles requiring response to previously defined alternatives to manifold vacuums referenced to atmospheric pressure, vent hole 111 may be deleted and the interior of the case 13 referenced to a full vacuum or any secondary pressure by suitable connecting means, or the pressure sensing means 35 may be of standard conventional design for pressure sensing relative to full vacuum, atmospheric or any secondary pressure, all without departing from the spirit and scope of the present invention.

The instrument dial 29' as above disclosed optionally eliminates the need for the stop portion 75. In other words, the length of the green indicia 109a may simply be of sufficient degrees of angular displacement of the needle 45'' so that intake manifold vacuum from 30 inches of mercury to 8 inches of mercury does not change the color of the indicia being visibly displayed through the transparent window 107. In other words, the yellow indicia 109b preferably commences to appear in the transparent window 107 at the precise point in which the enrichment valve in the carburetor begins to be actuated, i.e., approximately manifold vacuum of 8 inches of mercury. It should be understood that the yellow indicia 109b could be rearranged so as to appear at some other manifold pressure without departing from the spirit and scope of the present invention.

Although the invention has been described and illustrated with respect to preferred embodiments thereof, it is not to be so limited since changes and modifications may be made therein which are within the full intended scope of the invention.

I claim:

1. In combination with a speed rate indicator means for a vehicle having a throttle and intake manifold and incorporating a first visual indicator for said means, an engine efficiency indicator means for revealing within limits the operating efficiency of the vehicle internal combustion engine, said engine efficiency indicator means being pivotally mounted with respect to said speed rate indicator means, said engine efficiency indicator means including a second visual indicator normally pivoted a select degree by movement of said first visual indicator regardless of the vehicle speed when the operating engine is within a predetermined efficiently functioning range, pressure sensing means responsive to the intake manifold vacuum of the engine for sensing changes in the magnitude of its vacuum normally brought about by various settings of the throttle, shifter means operatively associated with said speed rate indicator means and normally maintaining said second visual indicator pivoted to the select degree with respect to said first visual indicator, said shifter means being responsive to the said pressure sensing means and capable of displacing said second visual indicator from its normally fixed position with respect to said first visual indicator for displaying when the operating engine departs from the limits of its predetermined efficiently operating range.

2. The combination of claim 1 in which said first visual indicator includes a rotatable shaft having a rate indicating needle fixedly attached thereto and said second visual indicator includes an engine efficiency indicating needle concentrically disposed axially around said shaft and being free to pivotally swing independently of said shaft; and said shifter means includes a sleeve member concentrically disposed around and being axially driven by said shaft with said sleeve member being free to slide to and fro along the rotating axis of said shaft, first connecing means for connecting said pressure sensing means to said sleeve member whereby changes in the magnitude of the intake manifold pressure causes said sleeve member to slide axially along said shaft, and second connecting means for connecting said sleeve member to said engine efficiency indicating needle whereby the sliding movement of said sleeve member proportionally displaces said engine efficiency indicating needle from said rate indicating needle.

3. The combination of claim 2 in which is included a scale having indicia for visually indicating degrees of less than desirable operating efficiency of the engine.

4. The combination of claim 3 in which said scale includes a transparent disc segment fixedly attached to said rate indicating needle with said engine efficiency indicating needle being disposed behind said transparent disc segment whereby the displacement thereof may readily be observed through said transparent disc segment and measured by said indicia aligned therewith.

5. The combination of claim 3 wherein said first visual indicator includes an opaque disc with said rate indicating needle constituting a radially aligned segment thereof, said opaque disc being provided with a transparent window disposed coincident with at least a portion of said rate indicating needle and said engine efficiency indicating needle being fan shaped and disposed behind said opaque disc with a portion of said fan shaped needle being visible through said transparent window, said fan shaped engine efficiency indicating needle including indicia constituting at least two colors which establish said scale whereby the displacement of said engine efficiency indicating needle from said rate indicating needle may readily be observed through said transparent window with the degree of efficiency generally being indicated and measured by the particular color being visibly displayed through said transparent window.

6. The combination of claim 1 in which said rate indicator means constitutes speedometer means for indicating the speed of a vehicle.

7. The combination of claim 1 in which said rate indicator means constitutes tachometer means for indicating the speed of the engine revolutions.

8. In combination with a rate indicator means having a rotatable shaft with a rate indicating needle fixedly attached thereto, an engine efficiency indicator means for indicating within limits the operating efficiency of an internal combustion engine having an intake manifold and a throttle, said engine efficiency indicator means comprising an engine efficiency indicator needle normally aligned with said first visual indicator when the operating efficiency of the engine is within certain predetermined limits, said engine efficiency indicator needle being concentrically disposed about said shaft and being free to pivotally swing independently of said shaft, bellowslike pressure sensing means responsive to the intake manifold vacuum of the engine for sensing changes in the magnitude of the intake manifold vacuum normally brought about by select settings of the throttle, elongated sleeve means concentrically disposed about and being axially driven by said shaft with said sleeve means being free to slide to and fro along the rotating axis of said shaft, first connecting means coupling said pressure sensing means to said sleeve means, said sleeve means being provided with a concentric groove disposed adjacent one end thereof, said first connecting means including a first nub extending into said concentric groove for urging said sleeve means to slide axially along said shaft as said bellowslike pressure sensing means responds to changes in the intake manifold vacuum, second connecting means coupling said sleeve means to said engine efficiency indicator needle, said second connecting means including providing said sleeve means with a helical groove disposed a spaced distance from said concentric groove, said second connecting means additionally including a second nub extending into said helical groove for urging said engine efficiency indicating needle to a position which is displaced from said rate indicating needle by the sliding movement of said sleeve means as the efficiency of the engine diminishes below predetermined limits.

9. The combination of claim 8 and including a scale having certain indicia for visually indicating degrees of less than predetermined desirable operating efficiency of the engine.

10. The combination of claim 9 in which said scale includes a transparent disc segment fixedly attached to said rate indicating needle with said engine efficiency indicating needle being disposed behind said transparent disc segment whereby the displacement thereof may readily be observed through said transparent disc segment and measured by said indicia aligned therewith.

11. The combination of claim 9 in which is included an opaque disc with said rate indicating needle constituting a radially aligned segment thereof, said opaque disc being provided with a transparent window disposed coincident with at least a portion of said rate indicating needle and said engine efficiency indicating needle being fan shaped and disposed behind said opaque disc with a portion of said fan shaped needle being visible through said transparent window, said fan shaped engine efficiency indicating needle including indicia constituting at least two colors which establish said scale whereby the displacement of said engine efficiency indicating needle from said rate indicating needle may readily be observed through said transparent window with the degree of efficiency generally being indicated and measured by the particular color being visibly displayed through said transparent window.

12. In combination with a speed rate indicator means incorporating a first visual indicator and for use upon a vehicle having a throttle and an intake manifold, an engine efficiency indicator means having a second visual indicator for revealing within limits the operating efficiency of the vehicle engine, said engine efficiency indicator being coupled to said speed rate indicator for simultaneous positioning of their visual indicators regardless of the vehicle speed, and shifter means operatively associated with said indicator means and structurally responsive to vacuum changes in the intake manifold for displacing said second visual indicator from its positioning with respect to said first visual indicator for indicating when the operating engine departs from the limits of its predetermined efficiency range.

13. In combination with a speed rate indicator means incorporating a first visual indicator and for use in conjunction with an engine and a motor, an efficiency means having a second visual indicator for revealing within limits the operating efficiency of the said engine, said efficiency indicator being coupled to said speed rate indicator for simultaneous positioning of their visual indicators regardless of the speed rate indication, and shifter means operatively associated with said indicator means and structurally responsive to efficiency changes in the said engine for displacing and second visual indicator from its positioning with respect to said first visual indicator for indicating when the operating engine departs from the limits of its predetermined efficiency range.

* * * * *

UNITED STATES PATENT OFFICE
CERTIFICATE OF CORRECTION

Patent No. 3,942,364　　　　　Dated　March 9, 1976

Inventor(s)　Homer S. Bunker

It is certified that error appears in the above-identified patent and that said Letters Patent are hereby corrected as shown below:

Claim 2, line 25, change "connecing" to --- connecting ---.

Claim 13, line 13, change "and" to --- the ---.

Signed and Sealed this eleventh Day of May 1976

[SEAL]

Attest:

RUTH C. MASON
Attesting Officer

C. MARSHALL DANN
Commissioner of Patents and Trademarks